United States Patent [19]

Weissler

[11] 4,160,581
[45] Jul. 10, 1979

[54] POSITIONING SYSTEM OF THE OPTICAL AXES OF AN OBSERVATION DEVICE FOR COUPLED IMAGES, AND THE OBSERVATION DEVICE FOR SUCH A SYSTEM

[75] Inventor: Alain Weissler, Boussy-Saint Antoine, France

[73] Assignee: Louis Peretz, La Celle Saint-Cloud, France

[21] Appl. No.: 831,912

[22] Filed: Sep. 9, 1977

[51] Int. Cl.² ............................................. G02B 27/22
[52] U.S. Cl. ..................................... 350/133; 350/247
[58] Field of Search .................. 350/75, 130, 133, 143, 350/132, 247, 139

[56] References Cited

U.S. PATENT DOCUMENTS 2,225,602  12/1940  Ryker ..................................... 350/139

FOREIGN PATENT DOCUMENTS 842247  6/1939  France ...................................... 350/133

Primary Examiner—John K. Corbin
Assistant Examiner—Scott J. Sugarman
Attorney, Agent, or Firm—Cushman, Darby & Cushman

[57] ABSTRACT

A system for adjusting the relative position of the optical unity axes used in viewing images of associated couples. In order to permit a satisfactory cerebral fusion when two images present a displacement in their positioning, a viewer is equipped within the optical block having the cylindrical and lateral surfaces and cooperating with surfaces of complementary forms and of the baseplate. Ocular circles define the position of the observer's eyes. The invention is particularly useful for projection onto a screen of pairs of stereoscopic images.

8 Claims, 5 Drawing Figures

POSITIONING SYSTEM OF THE OPTICAL AXES OF AN OBSERVATION DEVICE FOR COUPLED IMAGES, AND THE OBSERVATION DEVICE FOR SUCH A SYSTEM

The present invention relates to optical apparatus for the observation of coupled images which must be viewed simultaneously.

In order to provide good geometrical coincidence of these images, good aesthetics and understanding of their content, adjustment of the relative position of the two optical unity axes is necessary in order to ensure simultaneous observation.

This invention aims at proposing such a system.

When the coupled images are stereoscopic the necessity for an adjustment is particularly strong. Each image represents the same subject recorded from two different angles in order to give binocular vision and cerebral fusion by means of the viewers, i.e., a total image which appears to be in relief or three dimension. However, it is known that the brain's task cannot be completed if the homologous points of the two coupled images are not positioned with precision in relation to the optical axes of the observer's eyes. More precisely, the line joining two respective homologous points of two images viewed and the line joining an observer's pupils must be parallel.

The simplest method consists in a direct visual observation of coupled images through convergent ocular glasses. The apparatus for this process will be referred to hereafter in the text as a stereoscopic viewer.

One of the methods most utilized in order to view coupled images is projection onto a screen using two projectors, each of which respectively projects one of the two images. The selection of the images destined respectively for each eye of the observer is possible by various known means of which the most common make use of the polarization of light.

When either projection onto a screen or direct observation is used, to satisfy the above requirements apparatus is used allowing adjustable displacement parallel to the two optical axes.

The reason for such displacement results from the geometrical differences in the relative positioning of the coupled images, linked to their creation methods. Most of the time the images are photographic and their connection side by side for observation is of three types. Firstly, the photographs are physically independent and their positioning depends essentially on the geometry of the frame supporting them and on the position of the observation device receiving them. Secondly, the photographs previously independent are united in a single frame and juxtaposed side by side. The precision with which they are positioned depends on the juxtaposition operation. Thirdly, the photographs were taken simultaneously on a single and sensitive support, and they are viewed in relation to this. The precision thus depends on the precision of the very camera itself. In every case an adjustment is generally necessary before viewing each couple.

Adjustment devices aimed at achieving this end have been proposed before. Some use mechanical devices with grooves ensuring the shifting of one of the optical elements - ocular or objective—in relation to the other one, in a direction perpendicular to the plane containing the optical axes. Others, as in the case of projection with two projectors, cause the displacement of one of the projectors in relation to the other. In all these systems, the adjusting systems are heavy, bulky and not very precise.

This present invention avoids these disadvantages. It allows easy and simultaneous parallel displacement of the two axes of the two optical devices necessary for the viewing of the coupled images. It also allows for a remote adjustment of displacements. Finally, it allows use of this adjustment in relation to every observed couple of images, by reference to elements drawn on these two axes. For this it uses in principal the fixing of an optical unit in a movable support with main anterior and posterior faces on which the units are fixed. Lateral faces are equipped with components permitting it to turn around an axes of rotation parallel to the axes of the optical units by resting in complementary components by a cradle or fixed stand.

In an especially advantageous embodiment of the invention, the aforesaid components are parts of a cylindrical surface.

More precisely the invention concerns a positioning of the optical axes, in an observation device for coupled images connected side by side in a support plane fixed on a stand. Two convergent optical units are connected in tandem side by side in a stand, in a single block with their parallel optical axes in front of the aforesaid coupled images of which they give optical coupled images enlarged for the aforementioned observation. This block can turn in relation to the aforesaid stand. Both have lateral faces co-operating in front of each one, with cylindrical surfaces on axes parallel to those of the two optical units.

The invention will be better understood with the help of the following description, using the attached illustrations wherein.

Figures 1A, 1B:
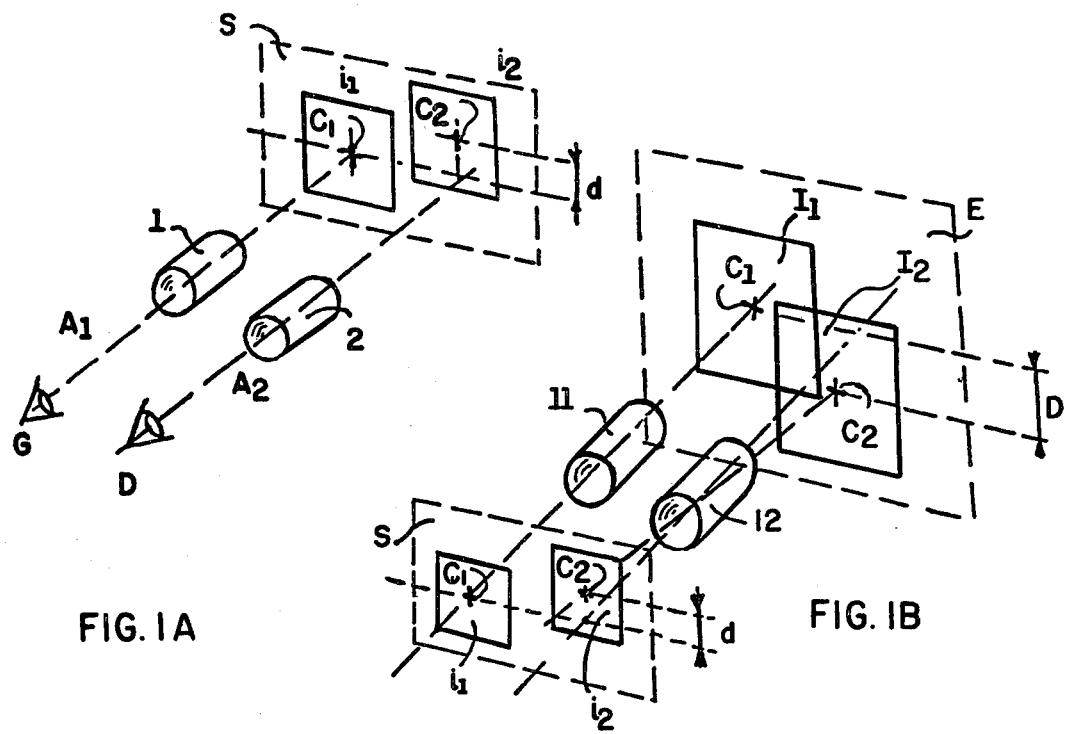
FIG. 1 illustrates according to two explanatory diagrams (a) and (b) the problem to be corrected.

In FIG. 1 the two explanatory diagrams (a) and (b) show how the errors discussed above are corrected, in the respective cases of a viewer and of a pair of projectors for stereoscopy.

In (a) the two images (i1) and (i2) are viewed directly by an observer's eyes (G) and (D) through two optical units (1) and (2). The images are fixed in a single support plane (S) and show the fault previously mentioned, i.e., the homologous points are not situated in the same disposition in relation to the observation axes (A1) and (A2). Especially, when considering, for example, their geometrical center, if the (A1) axis meets the plane of the image (i1) in its center (C1), then the (A2) axis meets the image (i2) plane in a point distant from the center (C2) by a length (d).

The eyes (G) and (D) will suffer muscular strain from trying to attain, in spite of the vertical difference of the two coupled images, the cerebral fusion absolutely necessary for the stereoscopic sensation which will make it difficult if not impossible to obtain this result.

In (b) images are viewed using the projection onto a screen (E). The projection apparatus is composed of two optical units (11) and (12) forming on the screen two enlarged and real images (I1) and (I2) of (i1) and (i2) which are fixed in a support plane (S).

In consequence of the vertical difference (d) of the coupled images in their stand, a difference (D) is suffered by the images enlarged on the screen with the same psycho-physiological consequences as in the case (a).

Although it does not form part of this invention, a selecting apparatus can be noted as an example in which two polarizing filters are formed with crossed polarization directions set on the way of the two projection pencils of ray. Its other selecting apparatus is compatible with the positioning system of the optical units axes belonging to this invention.

Figure 2:
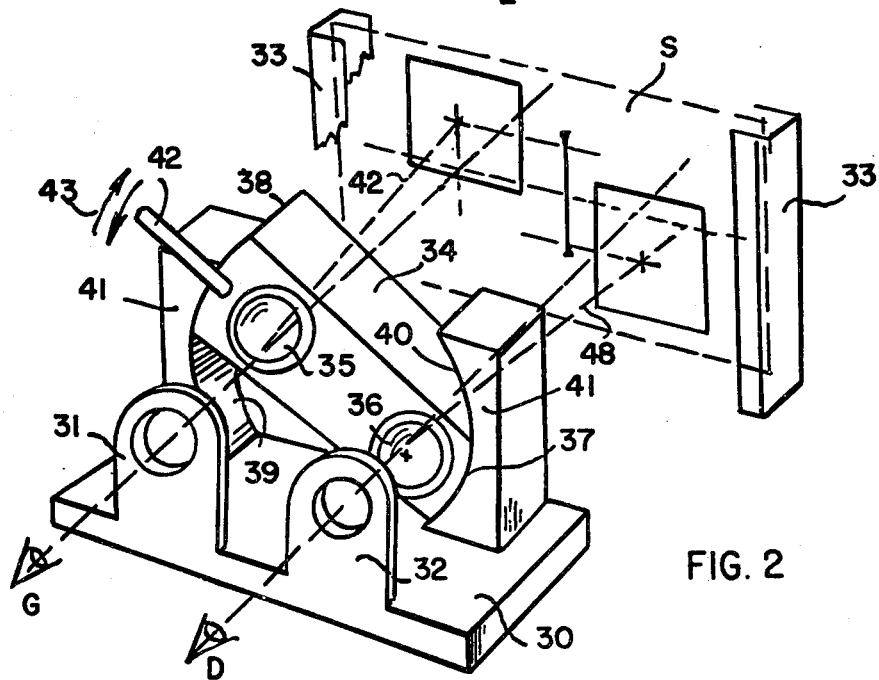
FIG. 2 shows a method of working of the positioning system according to the invention in a viewer.

FIG. 2 represents a practical method of realizing the positioning system according to the invention in the case (a) of a viewer as described above.

The general structure of the viewing device is composed of a stand (3) supporting two eyepiece shades (31) and (32) which have a geometrical role, and a stand with grooves (33) for placing the coupled images (S) to be viewed. According to the invention the viewer is made up of a separated optical block (34) with two optical units (35) and (36). This block can turn around a direction parallel to the optical unit axes due to lateral sides (37) and (38) in cylindrical form cooperating with the stand (30).

The working of a practical viewing device according to the invention can be deduced from the information given above. The observer places his eyes (G) and (D) before the eyepiece shades (31) and (32) which define the orientation of the observation basis of a horizontal reference. Then he displaces the optical units (35) and (36) by the same amplitudes and in opposite direction by setting in action the lever (42), in the direction of the arrows (43), unitl he has visually removed the apparent difference between the coupled images. The optical paths so obtained are represented on the picture by (47) and (48) and it is to be noted that each crosses the corresponding image in a point distant by d/2 from the image center.

Figure 3:
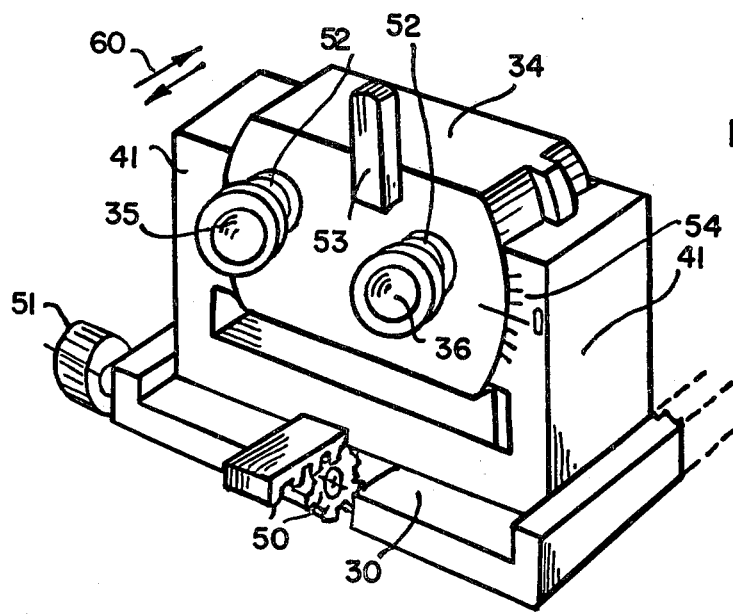
FIGS. 3 and 4 show two methods of the positioning system in the case of a projector (on screen).

FIG. 3 represents a first realization of the positioning system according to the invention, of the case illustrated in (b) of FIG. 1, that is, projection onto a screen of coupled images. For simplicity the same reference numbers are used for the same components of the system are used as in FIG. 2. This system is composed of an optical block (34) which can turn about cylindrical bearings or surfaces with the same structure and function as for the viewer. (FIG. 2). The representation of the light source and the means for focussing have been omitted in order to simplify the diagram.

However, this embodiment differs from that of the viewer in FIG. 2 in that projection requires the possibility of adjustment to give a sharp image on a large screen; and thus the invention allows for the movement of the optical block (34) and its baseplate (41), in relation to the stand (3). A mechanism similar to a rack and pinion system (5) operated by the knurled button (51) permits the simultaneous adjustments of the two optical units (35) and (36). In addition to this, a separate fine adjustment is included in the form of a threaded system (52) supported by the optical units and able to interact with the complementary faces supported by the block. The adjustment of the position of the optical axes is by the lever (53). A graduated scale (54) allows for recording the adjustment which corresponds to each couple by the direct reading of angular values.

Figure 4:
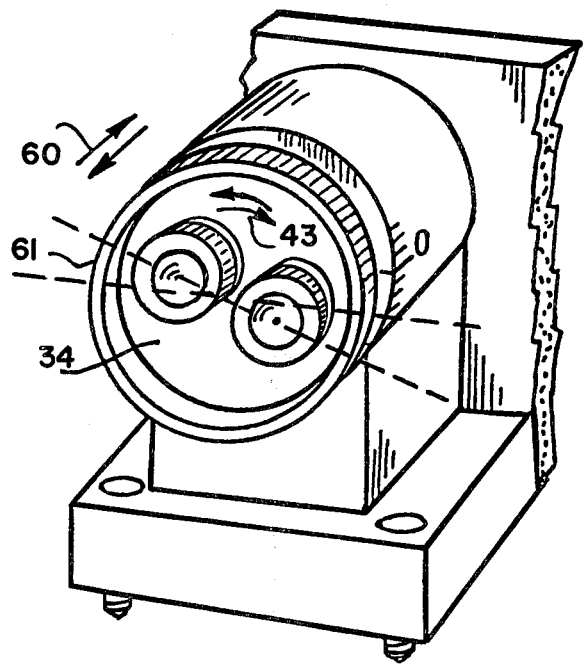

FIG. 4 shows a second method of the positioning system in the case of projection. Advantage is taken of the fact that the projectors for single images with known structures are usually composed of a support for their mono-objective optical unit which is generally cylindrical. This shape is adapted to the exterior surface itself of the optical unit and intended to be placed there.

The embodiment according to FIG. 4 is thus particularly advantageous. By substituting the optical block with two optical units of the invention for a single objective of such a projector, the cylindrical faces necessary to the invention baseplate still exist. Further, by movement of an exterior knurled knob (61) on the optical block (34) the required position is easily found. Another advantage comes from the use in FIG. 4 of the simultaneous focussing of the projected images without using the rack and pinion system as in FIG. 3. In fact, projectors for single images usually already have a focussing device which works by movement parallel to its axes of the mono-objective optical block. By an appropriate sizing of the exterior cylindrical surface of the two optical unit blocks of the invention to give them interchangeability with the known mono-objective optical block, it is possible to achieve econonimically the positioning needed for a good viewing of coupled images and to know the optimum focussing position (60) and the optimum position for the optical axis (43).

It should be noted that the embodiment of FIG. 4 lends itself especially to viewing stereoscopic coupled images which are photographically made on a stand which has a standardized width of 60 mm and where they occupy that width side by side. In these conditions, the cylindrical optical block of the invention has a diameter compatible with its use in projectors designed for single images of which at least one of the sizes accurately reaches the indicated value.

In other respects though the realization methods previously described are for the viewing of stereoscopic coupled images the advantages of the inention include all the applications where two images must be viewed, even temporarily, in an exact coincidence of some of their elements, for example, the type of viewing called revolve-unity where two successive images follow one another in the time with an intermediate period where they are simultaneously observed.

Finally, the invention's positioning system since only a simple rotational movement by cylindrical guidance or by an electro-magnet is needed, remote control from a distance is possible. This remote control can be either manual or automatic by electro-mechanical means from a correcting signal preferentially drawn on an image of the viewed images, in reference unities formed corresponding to the searched positioning corrections. These reference unities can be mechanical in marginal tooth rack form drawn on the images frame or more generally of all type adapted for determining series of coded values which can be exploited for the creation of an electrical signal of positioning correction.

The exterior diameter of the cylindrical lateral faces of the block is at best equal to the interior diameter of the baseplate of the single objective of a device used for the observation of single images, one dimension of which is about 60 mm.

Many changes and modifications in the above described embodiment of the application are possible without departing from the scope of the invention. Accordingly, that scope is intended to be limited only by the scope of the appended claims.

What is claimed is:

1. A device for viewing two coupled images simultaneously comprising a stand, two convergent optical units connected side by side in said stand, said units being mounted in a single block with their parallel optical axes in front of said coupled images to provide enlarged images for observation and means for rotating both of said units with respect to said stand, each of said units having lateral, cylindrical surfaces with axes parallel to said optical axes for adjusting that unit.

2. A device as in claim 1, wherein the exterior diameter of the cylindrical lateral faces of the aforesaid optical block is at the best equal to the interior diameter of the baseplate of the single objective of a device used for the observation of single images, one dimension of which is about 60 mm.

3. A device as in claim 1, wherein said enlarged coupled images are real images, and the device is a viewer.

4. A device as in claim 1, wherein said enlarged coupled images are real images, and the device is a projector.

5. A device as in claim 1, wherein said units include two eyepiece shades defining the orientation of the observation basis.

6. A device as in claim 1, including a baseplate locked with said units for said lateral faces.

7. A device as in claim 6, wherein said baseplate moves parallel to said optical axes following the said stand.

8. A device as in claim 1, wherein said units are mounted for parallel movement to the aforenamed optical axes.

* * * * *